United States Patent [19]
Messenger

[11] Patent Number: 6,103,356
[45] Date of Patent: Aug. 15, 2000

[54] NONADHESIVE LAMINATE FOR STRUCTURAL SEALING

[76] Inventor: Gary W. Messenger, 2060 Poloma St., Pasadena, Calif. 91104

[21] Appl. No.: 09/025,397

[22] Filed: Feb. 18, 1998

Related U.S. Application Data

[60] Provisional application No. 60/038,093, Feb. 18, 1997.

[51] Int. Cl.⁷ ...................................................... B32B 7/02
[52] U.S. Cl. ........................ 428/215; 428/332; 428/339; 428/489
[58] Field of Search .............................. 428/88, 480, 489, 428/523, 354, 430, 332, 339, 40.3, 215; 156/71, 249; 52/408, 409

[56] References Cited

U.S. PATENT DOCUMENTS

| | | | |
|---|---|---|---|
| 4,039,706 | 8/1977 | Tajima et al. .............................. | 428/40 |
| 4,055,453 | 10/1977 | Tajima et al. ............................ | 156/279 |
| 4,103,061 | 7/1978 | Chomes ................................... | 428/247 |
| 4,235,953 | 11/1980 | Kumins et al. .......................... | 428/332 |
| 4,248,926 | 2/1981 | Tajima et al. ............................ | 428/253 |
| 4,357,377 | 11/1982 | Yamamoto ................................ | 428/40 |
| 4,417,939 | 11/1983 | McAdams ............................... | 156/282 |
| 4,442,148 | 4/1984 | Stierli ....................................... | 428/40 |
| 4,636,414 | 1/1987 | Tajima et al. ............................. | 428/40 |
| 4,870,796 | 10/1989 | Hart et al. ................................. | 52/409 |
| 4,936,938 | 6/1990 | Simpson et al. ................... | 156/244.23 |
| 5,096,759 | 3/1992 | Simpson et al. .......................... | 428/40 |
| 5,142,837 | 9/1992 | Simpson et al. .......................... | 52/409 |

*Primary Examiner*—Deborah Jones
*Assistant Examiner*—Abraham Bahta
*Attorney, Agent, or Firm*—Christie, Parker & Hale, LLP

[57] ABSTRACT

A nonadhesive waterproofing laminate for sealing structural joints and surfaces has a central self-sealing core sheet of bituminous rubberized asphalt, and inner and outer polymer sheets secured to opposite sides of the core sheet. The laminate is secured to a structural substrate with nails or staples, and the self-sealing action of the core sheet prevents leakage around the shanks of these fasteners.

4 Claims, 1 Drawing Sheet

NONADHESIVE LAMINATE FOR STRUCTURAL SEALING

CROSS-REFERENCE TO RELATED APPLICATION

This application claims the benefit of U.S. Provisional Application Ser. No. 60/038093 filed Feb. 18, 1997.

BACKGROUND OF THE INVENTION

This invention is directed to waterproofing and sealing of structural joints and surfaces such as around window and door frames, over parapet walls and pot shelves, around vents, and the like. Existing waterproofing or flashing materials such as asphalt-saturated papers are not self sealing around fastening nails or staples, and are subject to leakage of wind-driven rain. Self-adhesive rubberized-asphalt bituminous sheets have been used for structural sealing, especially on roofs, but these materials are difficult and time-consuming to apply after removal of an adhesive-protecting release sheet, and cannot readily be removed should adjustments or insertion of building paper be needed before application of a finishing material such as stucco. The laminate of this invention eliminates these problems, and provides a dependable and easily installed waterproof membrane for sealing of structural joints and surfaces.

SUMMARY OF THE INVENTION

The sealing laminate of this invention is a three-layer laminate with a central core sheet of bituminous rubberized-asphalt with self-sealing properties. An outer plastic film is secured to a weather-facing side of the core sheet, and an inner plastic film is secured to the opposite structure-facing side of the core sheet. Preferably, the core sheet has a thickness of about 0.025 to 0.030 inch, the outer plastic film is polyurethane of about 0.003-inch thickness, and the inner film is polyester of about 0.002-inch thickness. Both faces of the laminate are free of adhesive.

DESCRIPTION OF THE PREFERRED EMBODIMENT

Figure 1:
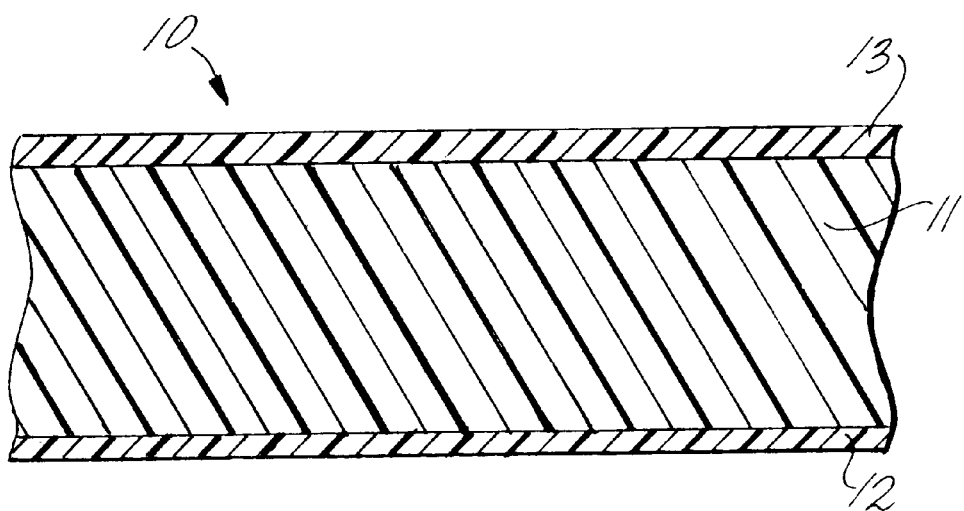
FIG. 1 is a sectional side view of the laminate of this invention.

A laminate 10 according to the invention is shown in FIG. 1, and is a three-layer flexible membrane with self-sealing properties provided by a central core sheet 11 of a rubberized-asphalt bitumen which is preferably about 0.025 to about 0.030 inch thick. Adhered to an inner structure-facing side of sheet 11 is a relatively thin polyester sheet 12 (a preferred material being available under the trademark Mylar) of about 0.002-inch thickness. Adhered to an outer weather-facing side of sheet 11 is a sheet 13 of polyurethane plastic of about 0.003-inch thickness. The lamination process and suitable bituminous sheet materials are disclosed in U.S. Pat. No. 4,442,148, and for brevity, the disclosure of that patent is incorporated herein by reference.

Laminate 10 is preferably marketed in roll form (lengths of about 75 feet are typical), and in various widths (typically ranging from 4 to 36 inches) for different applications. The laminate is secured to a structural substrate with nails or staples, and bitumen sheet 11 seals around the shanks of these fasteners to maintain a waterproof barrier. In contrast to self-adhesive waterproofing laminates or membranes, sheet 11 is easily removed if adjustments are necessary, and can be resecured without loss of sealing against water leakage.

The 3-mil polyurethane plastic of sheet 13 lends strength and tear resistance to the laminate, and protects the relatively weaker bitumen sheet. Polyester plastic (Mylar) of sheet 12 provides adequate strength for the structure-facing side of the laminate, prevents sagging of the bitumen sheet, is impermeable by volatile organic vapors, and is economical as compared to polyurethane. The laminate has good tensile strength which has been measured as 31.5 pounds/inch (ASTM D-412), and tear strength of 44.7 pounds/inch (ASTM D-1938). The laminate also withstands flexing and elongation (129.6% as measured according to ASTM D-412), and can thus accommodate earthquake movement and structural settlement and sagging.

An outstanding advantage of the nonadhesive laminate of this invention is ease of installation (and, if necessary, removal for repositioning or insertion of building paper) as compared to commercially available self-adhesive laminates which require stripping of an adhesive-covering release sheet, and great care in handling to avoid inadvertent adhesive contact or misplacement of the sheet. By contrast, even a large sheet of the laminate of this invention is easy to handle, and is quickly and easily installed with nails or staples to provide a reliable waterproof barrier between underlying structure and overlying plastic or stucco.

What is claimed is:

1. A structural sealing laminate, comprising a bituminous rubberized-asphalt core sheet with a thickness in the range of about 0.025 inch to about 0.030 inch, and having first and second sides, an outer plastic film secured to the first side of the core sheet, and an inner film of an impermeable plastic secured to the second side of the core sheet.

2. The laminate of claim 1 in which outer surfaces of the laminate are free of adhesive.

3. The laminate of claim 2 in which at least one of the inner and outer films is polyester plastic.

4. The laminate of claim 3 in which the inner film is about 0.002-inch thick, and the outer film is about 0.003-inch thick.

* * * * *